United States Patent

[11] 3,583,680

[72] Inventors Alois Aust
Ratingen;
Emil Schuttler, Dusseldorf, both of,
Germany
[21] Appl. No. 765,182
[22] Filed Oct. 4, 1968
[45] Patented June 8, 1971
[73] Assignee Aust Und Schuttler & Co. M.A.S.-
Kunststoff-maschinen Gesellschaft mit
beschrankter Haftung
Dusseldorf, Germany
[32] Priority Oct. 5, 1967
[33] Germany
[31] P 16 79 800.8

[54] MIXING AND DISCHARGING APPARATUS FOR FILLERS AND BINDERS
11 Claims, 5 Drawing Figs.
[52] U.S. Cl.................................................. 259/7,
18/12
[51] Int. Cl.................................................. B01f 7/08
[50] Field of Search........................................... 259/7, 9,
10, 22, 25, 26, 97, 109, 110, 106, 42, 45, 46; 18/2
EP, 2 ES, 12 SH, 12 SP, 12 SS, 12 SN

[56] References Cited
UNITED STATES PATENTS
3,146,493 9/1964 Steinle et al. ................. 18/12(SP)
3,193,877 7/1965 Edwards....................... 18/12(SN)
3,199,147 8/1965 Aykanian et al.............. 18/12(SN)

*Primary Examiner*—Edward L. Roberts
*Attorney*—Holman & Stern

ABSTRACT: A mixing and discharging apparatus for fillers and binders, comprising a wormshaft consisting of at least three sections, the first of which, as viewed in the conveying direction, is provided with one or more worm threads and has a greater conveying rate than the last section likewise provided with one or more threads. A worm shaft exists between these sections which has a plurality of arms or fins for mixing the binder with the filler and there is a feed for introducing filler located at the beginning of the first section (first conveying section) and a further feed for introducing a binder located at the transition from the first section to the second section (mixing section) of the worm shaft.

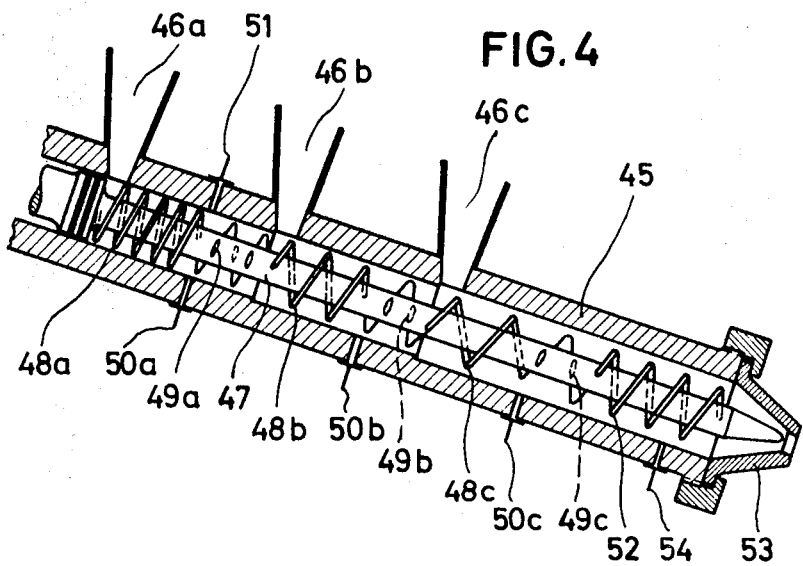
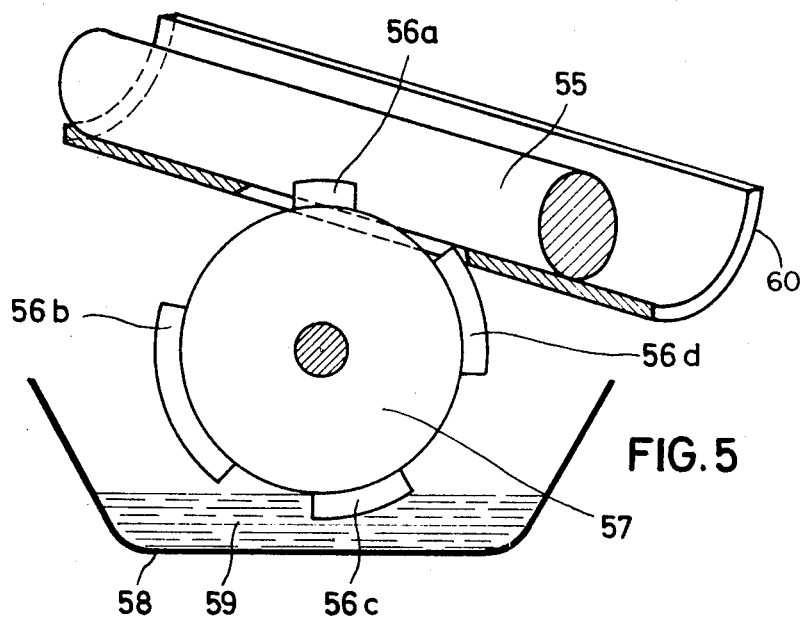

MIXING AND DISCHARGING APPARATUS FOR FILLERS AND BINDERS

The invention relates to an apparatus for mixing fillers and binders and for discharging the resultant mixture. For example, in the manufacture of artificial stone and artificial wood fillers such as sand, granulated or powdered stone, kaolin, wood chips or sawdust and fibrous materials are optionally added to the fillers to reinforce the finished product, in particular glass fibers. These fillers are mixed with various binders such as latex, bitumen and especially synthetic resins such as polyester and epoxy resin, tar-epoxy resin, polyvinyl acetate and foamable as well as nonfoamable polyurethanes and phenolic resins, and the resulting mixture is poured or pressed into forms or extruded.

The preparation and processing of such mixtures often meets with considerable difficulties, due to the nature of the materials and of the forming process. Abrasive fillers offer particular difficulties in this respect, while the difficulties encountered with the binders increase with their degree of viscosity.

The mixing and discharging apparatus according to the invention is distinguished by its great versatility, both with regard to the materials to be processed and in respect of the nature and type of the products which can be manufactured with its aid. Thus, the instant apparatus can process both abrasive fillers and highly viscous binders. The mixture can be shaped by moulding with or without pressure or by extrusion.

According to the invention, the apparatus comprises a worm shaft consisting of at least three sections, of which the first, as viewed in the conveying direction, is provided with one or more worm threads and has a greater conveying rate than the last section, which is also provided with one or more worm threads, whilst between these two sections the worm shaft is provided with a plurality of arms or fins for mixing the filler with the binder, a feed for the filler being located at the beginning of the first section and a feed for the binder being located at the transition from the first section (first conveyor section) to the second section (mixing section) of the wormshaft. The filler material introduced into the first section is conveyed to the mixing chamber by the threads of the shaft and, since the delivery rate of the third section is slower than that of the first section, the filler is compacted in the mixing chamber with simultaneous addition of binder, so that any included air is pressed back opposite to the conveying direction and at the same time an intensive mixing of filler and binder takes place. The last section also serves for discharging the mixture.

If the particle size of the filler is not uniform, or if fillers having different particle sizes are used, then, according to a further feature of the invention, the wormshaft consists of more than three sections and comprises conveying sections, provided with one or more threads, alternating with mixing sections wherein the shaft has a plurality of arms or fins, each conveying section serving to draw in a portion or fraction of the filler while a last section having one or more threads and a slower conveying rate than the preceding conveyor section is provided for discharging the mixture. In this manner, a better mixing of the filler fractions will be achieved than by a premixing outside the apparatus, at the same time economizing on a premixing unit. Therefore, the addition of the binder is effected either totality at the beginning of the first mixing section or in portions at the beginning of each individual mixing section. The conveying sections of the wormshaft must have a conveying rate adapted to the increase in material flow from one section to another, which is preferably ensured by a corresponding increase if the thread pitch from one section to another.

According to the invention, the binder is introduced as two or more components so selected that they exhibit practically no hardening prior to mixing they, while after their mixing undergo hardening within a predetermined length of time, so that the setting period can be adapted to the particular method of moulding (pouring, pressing or extrusion) and to the process steps connected therewith.

If the workpiece is to be given a certain color this can be colorant by the color of the filler, either by using a filler having a corresponding natural color or by admixing the filler with a colorant. It is also possible to mix the binder with the required colorants. The coloring of the workpiece can be effected in a particularly simple manner when, according to a further feature of the invention, a feed means is provided for the colorant at the transition from the first section (first conveying section) to the second section (mixing section) of the wormshaft. The addition of the colorant at this location ensures complete incorporation of the color into the filler together with the binder. If, according to another feature of the invention, the speed of the wormshaft is continuously variable, it is possible to vary not only the conveying rate but also the compacting of the filler.

In order to achieve control of the quantity of binder and optionally also of the amount of colorant added, means may be provided for controlling the feed pressure of the binder, binder components and optionally added colorant, and thus the quantity can be adjusted depending on the compression of the filler.

According to a feature of the invention, a marblelike aspect can be conferred on the product by providing a feeder means for one or more contrast colorants in the region of the last shaft section, in the region of the orifice of the worm cylinder or onto the emerging strand, depending on the intensity of color contrast desired.

If the blending-in of the colorant is effected at the beginning of the last shaft section, then the mixing is relatively intensive and the contrast accordingly weak. The closer the introduction of the contrast color is effected to the orifice of the worm cylinder, the sharper is the contrast. Here, according to a further feature of the invention, the quantity and/or the degree of dilution of the contrast color or colors can be varied by providing interchangeable mouthpieces of different outlet cross section, connectable with the worm cylinder, and/or by controlling the feed pressure of the contrast color or colors. The higher the compression of the mixture consisting of filler, binder and primary colorant, which, in addition to the speed of the shaft is determined by the size of the outlet cross section of the mouthpiece on the worm cylinder as well as by the speed of the shaft, the more intensively the contrast color is blended in. The higher the feed pressure of the contrast color or colors the greater the quantity of colorant introduced and the lower the blending.

The strongest contrast can be obtained by injecting the contrast color into the emerging strand. According to a further feature of the invention, this can be effected by means of a cutter wheel having a discontinuous peripheral edge, which dips into a colorant reservoir and cuts with its edges the emerging strand to color the latter at intervals.

In order to ensure uniform addition of binder, binder components and optional colorants, a further feature of the invention provides that the feeding of binder, binder components and colorant is effected by means of positive-displacement pumps driven by variable-speed motors.

If, as provided further according to the invention, the liquid materials to be added (binder, binder components, colorants) are stored in pressurized vessels, which feed the positive-displacement pumps and are equipped with means for maintaining a constant, adjustable pressure, then a particularly precise regulation of the additives can be achieved, which is especially advantageous for those materials which are required in small quantities only.

The invention will now be explained with reference to the accompanying drawings, which illustrate the invention but in no restrictive sense.

FIG. 4 shows schematically a detail of a modified form of embodiment, and

FIG. 5 shows a detail of a further modified form of embodiment.

Figure 1:
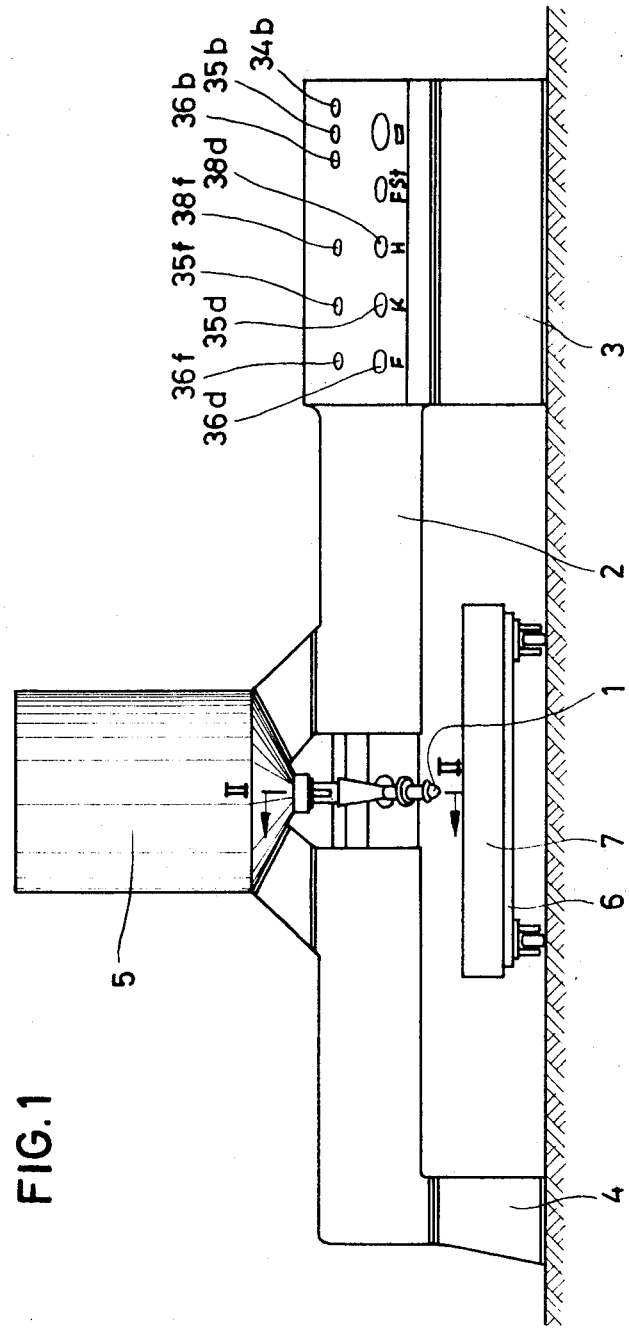
FIG. 1 shows a general view in elevation.

In the embodiment illustrated in FIG. 1, numeral 1 designates the mixing and discharging apparatus which is carried by a bridge 2 spanning the space between a control panel 3 and a bracket 4. The bridge 2 further carries a filler container 5. Beneath the bridge 2, a mould 7 is movable in all directions on a carriage 6, for filling with the material issuing from the mixing and discharge apparatus 1.

Figure 2:
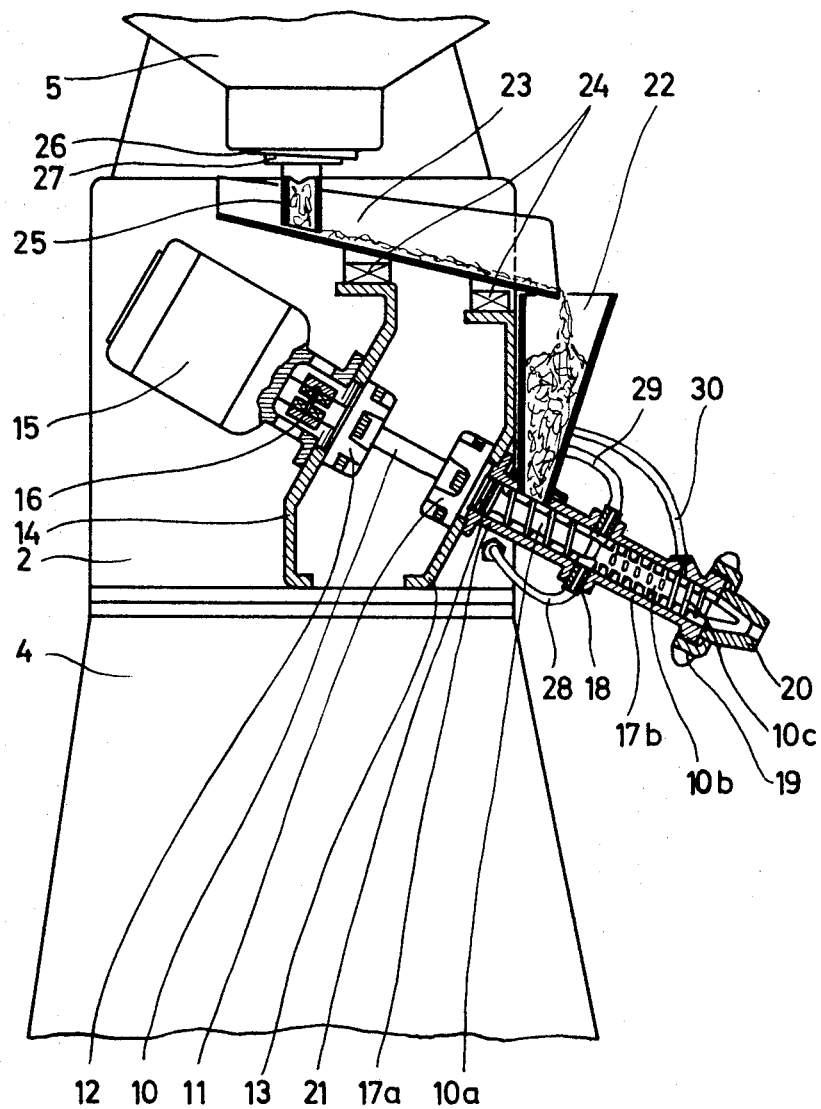
FIG. 2 is a section taken along the line II–II of FIG. 1.

As FIG. 2 shows, the mixing and discharging apparatus 1 consists of a worm shaft 10 rotatably mounted in bearings 11 and 12. The bearings 11 and 12 are fastened to web plates 13 and 14 respectively in the middle of bridge 2. The shaft butt of a motor 15 flanged to web plate 14 is rotation-secured to the worm shaft 10 by means of a plug coupling 16. The worm shaft 10 is in three sections: a first section as viewed in the direction of transport having one thread 10a; a second section 10b provided with several mixing blades; and a third section 10c, also provided with a single thread. The pitch and the depth of the thread in section 10a and section 10c respectively are so dimensioned that the section 10a has a higher delivery rate than section 10c. The second section 10b acts as a mixer. The worm shaft 10 is surrounded by a two-part cylinder whose first part 17a is flanged to the web plate 13 and whose second part 17b is flanged to the first part over an interposed connecting ring 18. On the free end of part 17b an interchangeable mouthpiece 20 is secured by means of a capscrew 19. A collar 21 on shaft 10 forms a seal with part 17a of the cylinder on the driven side of the shaft.

At the beginning of the first section 10a a funnel 22 for feeding the filler is seated in an aperture of cylinder part 17a. This funnel 22 is fed with filler from a container 5 by a chute 23. The chute 23 is mounted on vibrating supports 24 and a slight vibration is imparted to it by a drive not shown in the drawings. The container 5 has an outlet pipe 25 which is displaceable relative to the bottom of chute 23. The adjustment of pipe 25 relative to the bottom of chute 23 can be effected either by displacing the chute 23 via its vibrating supports 24 or, as in the present example, by means of a wedge plate 26, which is displaceably arranged between complementary wedge surface of flange 27 of discharge pipe 25 and the bottom of container 5. In the region of transition from the first section 10a to the second section 10b of wormshaft 10 the connecting ring 18 is located between cylinder parts 17a and 17b and carries the connections for the introduction of those additives which have to be completely blended into the filler, e.g. binder, binder components, primary colorant. In the present example, it is assumed that the primary colorant is already associated with the filler. The connecting ring is provided with two connections 28 and 29 for the components of the binder (resin and catalyst in the case of epoxy resins, in case of most polyester resins is, a portion of the resin admixed with an accelerator, and the catalyst is then mixed into the other portion of the resin).

In the region of the beginning of the third section 10c of the worm shaft, the part 17b, of the cylinder is provided with connections for the introduction of a contrast colorant or colorants, in the example here shown, the connection 30 for one contrast colorant.

Figure 3:
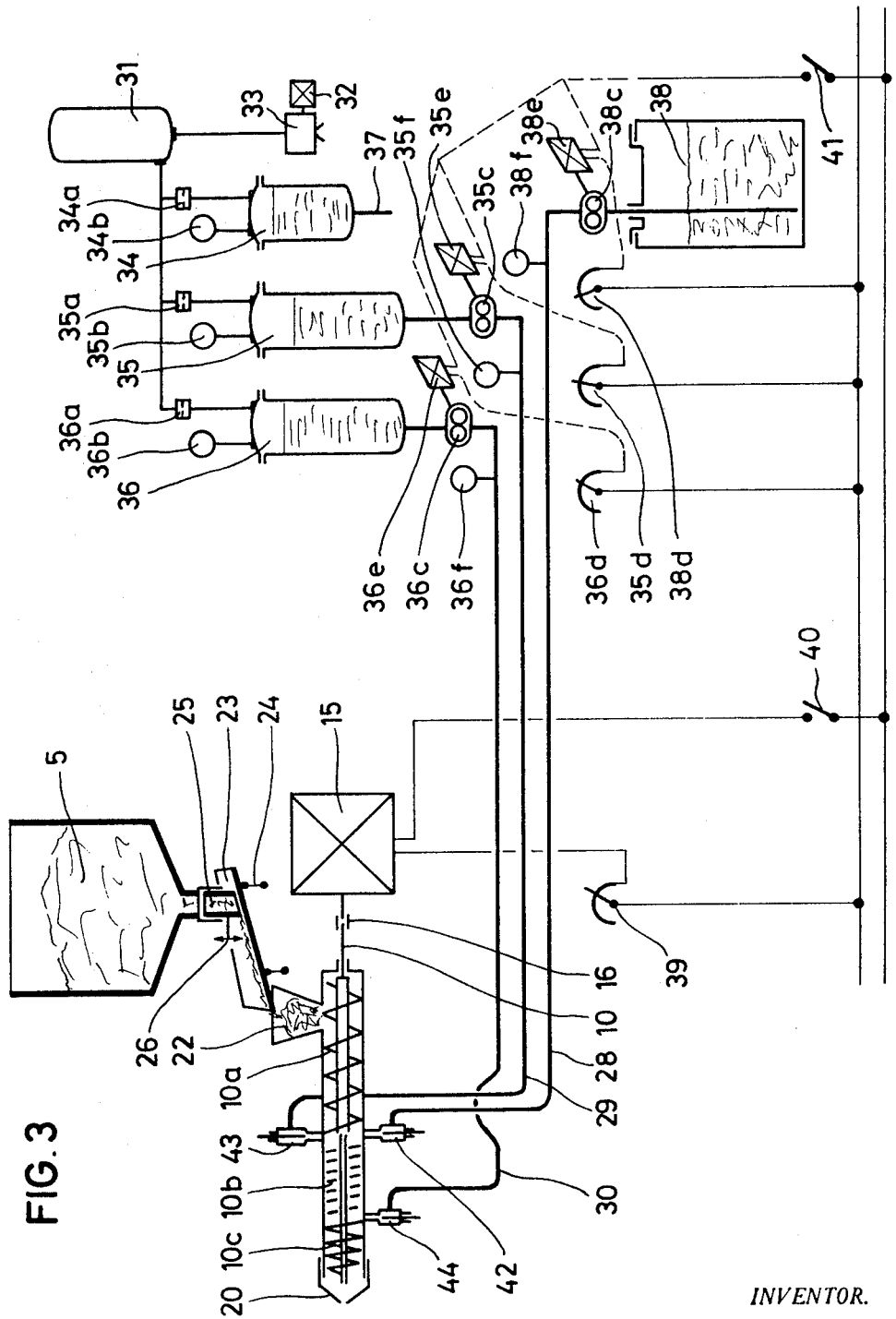
FIG. 3 is a diagrammatic illustration of a blending and discharging apparatus, as employed for the filling of forms in the manufacture of artificial marble.

The mode of functioning of the apparatus as a whole is described with reference to FIG. 3. Here, numeral 31 designates a compressed-air cylinder which is constantly refilled by means of a pump 33 driven by a motor 32. Three vessels 34, 35 and 36 are provided respectively for storing a solvent, a catalyst and a contrast colorant. The three vessels 34, 35, 36 are connected via pressure-reducer valves 34a, 35a, 36a to the compressed-air cylinder 31, so that in each of these vessels 34, 35, 36 there prevails a pressure indicated on the manometers 34b, 35b, 36b, said pressure being adjustable. Under the pressure prevailing in vessel 34 the solvent is conveyed from the vessel 34 into the pipe 37 and from there through pipes (not shown) and associated valves, which parts of the system have to be cleaned at the end of an operation or during a prolonged pause. A further vessel 38 is provided for storing a resin, a resin transfer vessel being shown for this purpose. To achieve precise proportions of resin, catalyst and contrast colorant, these materials are drawn from the vessels 38, 35 and 36 respectively by positive-displacement pumps 38c, 35c and 36c and fed to the worm shaft mixer. In particular precise addition of liquids which are to be added in small quantities only, i.e. the catalyst and the contrast colorant, is ensured by storing these materials in the vessels 35 and 36 under a constant, adjustable pressure. The speed of the positive-displacement pumps and thus their delivery rate as well as the feed pressure built up can be continuously varied by means of controllers 35d, 36d and 38d acting on DC motors 35e, 36e and 38e which drive the positive displacement pumps. The adjustable feed pressure of the individual materials can be read on the manometers 35f, 36f and 38f.

The drive motor of the shaft 10 is a DC motor 15, whose speed is continuously variable by means of the controller 39. By varying the speed of the worm shaft and by varying the distance between the discharge pipe 25 and the bottom of chute 23 the amount of filler processed per unit of time can be controlled. The shaft speed together with the size of the outlet orifice of the mouthpiece 20 also determines the degree of compression of the material. The binder component feed pressure which can be regulated through the controllers 38d and 35d determines the binder quantity. The feed pressure of the contrast colorant, which can be regulated via the controller 36d, regulates the quantity, degree of dilution or mixing of the contrast colorant depending on the dynamic pressure within the worm conveyor, i.e. depending on the filler feed rate, shaft speed and size of the outlet orifice of the mouthpiece.

On starting up the apparatus the motor 32 is activated first. As soon as a sufficient head is reached in the compressed-air cylinder 31, the rest of the switching steps are initiated, namely the switching-on drive motor 15 via the switch 40 and of the vibrator for the chute 23. As soon as a sufficient quantity of filler has been introduced, the binder feed and the contrast colorant feed are activated by means of switch 41. The valves 42, 43 and 44 in the feed conduits 28, 29 and 30 respectively, are then opened electrically or by means of compressed air drawn from cylinder 31 in a manner not shown. The switching-off of the apparatus is effected in inverse sequence.

The mixing and discharging apparatus illustrated fragmentarily in FIG. 4 is for processing fillers having different particle sizes. Three funnels 46a, 46b and 46c are connected to the worm cylinder 45, through which funnels the three fractions of the filler are introduced, in particular the finest at 46a and the coarsest at 46c. The wormshaft 47 has three conveying sections 48a, 48b and 48c for introducing the filler fractions, each provided with threads. The conveying section 48a is followed by a mixing section 49a, the conveying section 48b is followed by a mixing section 49b, and the conveying section 48c is followed by a mixing section 49c. The conveying section 48c has a delivery rate greater than that of section 48b and the latter in turn has a delivery rate greater than that of section 48a, in accordance with the increase of material flow after addition of the second and third filler fractions. The mixing sections 49a, 49b and 49c comprise blades on the wormshaft 47. Mixing section 49a serves to mix in the binder portion added to the first filler fraction at 50a, as well as the primary colorant added at 51; mixing section 49b serves for blending in the second filler fraction and the binder components added at 50b; and the mixing section 49c serves for blending in the third filler fraction and the binder components introduced at 50c. The last conveying section 52, whose delivery rate is lower than that of conveying section 48c, serves for compressing the material stream and for discharging it through the mouthpiece 53 of worm cylinder 45. Reference numeral 54 designates the feed conduit for the contrast colorant to be introduced. In the modification shown here, the screw threads have the same external diameter in all sections of the wormshaft 47, and the delivery rate in the individual conveying sections is varied by altering the worm pitch. The bore of the worm cylinder is widened at the beginning of conveying sections 48b and 48c, so that between the worm thread and the cylinder wall a gap is provided whose size corresponds at least to the greatest diameter of the particles of filler appearing in the section concerned.

Whereas in the preceding examples the contrast colorant was added to the material stream within the worm cylinder, the example of FIG. 5 shows another possible mode of contrast colorant addition. According to the latter, the contrast colorant is added to the strand 55 issuing from the mouthpiece of the worm cylinder by means of cutters 56a, 56b, 56c and 56d which are irregularly distributed on a wheel 57. During their revolution, the cutters 56a —d dip into the contrast colorant 59 stored in a vessel 58. Through a slot in the bottom of the chute 60 which carries the emerging strand 55 the cutters, coated with colorant, penetrate into the strand 55 and transfer the colorant thereto. This mode of contrast colorant introduction results in a particularly strong contrast in coloring, since the colorant is mixed into the composition only to a slight extent in the mould.

The invention is not restricted to the examples of embodiment hereinbefore described and illustrated. In addition to the already described modifications, the examples of embodiment may be modified for different types of application. The exemplary arrangement of the mixing and discharging device 1 on bridge 2 is required only when the apparatus is to be used for filling large-surface moulds 7, which have to be moved in all directions beneath the mixing and discharging device. If smaller moulds are to be filled the bridge 2 may be completely dispensed with and the mixing and discharging device 11 may be directly mounted on the control unit of the machine. This form of embodiment is to be preferred when the shaping of the product is to take place by extrusion.

Although the invention has been described and illustrated in detail, it is to be understood that this does not delimit the invention, rather the scope and spirit of the invention is limited only by the language of the appended claims.

We claim:

1. A mixing and discharging apparatus to produce a product composed of filler and binder, comprising a wormshaft contained in a housing and having a rotating means, which shaft consists of at least three sections, the first section as viewed in the conveying direction being a conveying section and provided with at least one worm thread, the last section is provided with at least one worm thread, the threads of said first and last section being such that the conveying rate is greater in said first section than in said last section, intermediate said first and last sections is a mixing section having a plurality of arms for mixing the binder with the filler: feed means for introducing the filler located at the beginning of said first section: and second feed means for introducing the binder located at the transition from said first section to said mixing section of the wormshaft whereby the filler and the binder are thoroughly mixed and compressed in said mixing section.

2 The apparatus as claimed in claim 1 wherein the worm shaft consists of more than three sections and comprises, in the conveying direction, conveying sections each provided with at least one thread alternating with mixing sections each provided with a plurality of arms, and said last section has a lower conveying rate than the preceding sections, the second feed means introduces a portion of the binder at the transitions between the alternating conveying and mixing sections, and the filler feed means introduces a fraction of the filler at the beginning of each of said conveyor sections, the delivery rate of the successive conveying sections increases in accordance with the increase in material flow occasioned by addition of the filler fractions.

3. The apparatus as claimed in claim 2, wherein each successive conveying section, with the exception of said last section, has an increased thread pitch to increase the conveying rate while the external diameter of the worm thread remains the same in all sections.

4. The apparatus as claimed in claim 1, and further comprising at least two second feed means to introduce the binder in at least two separate components which do not harden prior to being mixed together but undergo hardening within a predetermined period after mixing.

5. The apparatus as claimed in claim 1, and further comprising a third feed means for introducing colorants at the transition from said mixing section to said last section.

6. The apparatus as claimed in claim 5, and further comprising control means for controlling the feed pressure of the binder and colorant.

7. The apparatus as claimed in claim 6 wherein said control means comprises positive-displacement pumps driven by variable-speed motors.

8. The apparatus as claimed in claim 7, and further comprising pressurized vessels for storing said binder and colorants and for feeding the positive-displacement pumps through conduits connected therewith, and further means for maintaining a constant, adjustable pressure.

9. The apparatus as claimed in claim 5 wherein said third feed means has interchangeable mouthpieces of different outlet cross section, and further comprising means for controlling the feed pressure of the colorants in order to vary the quantity of the colorants and the degree of dilution thereof.

10. The apparatus as claimed in claim 1 wherein said rotating means permits the speed of the wormshaft to be continuously variable.

11. The apparatus as claimed in claim 1, and further comprising a cutter wheel having irregularly distributed peripheral cutters arranged beyond the end of the worm shaft housing, which wheel dips its cutting edges into a colorant reservoir and cuts into the product from below through a slot in a chute that carries the emerging product.